United States Patent [19]

Yamamoto et al.

[11] Patent Number: 4,825,366

[45] Date of Patent: Apr. 25, 1989

[54] LOCKUP CONTROL SYSTEM FOR AUTOMATIC TRANSMISSION

[75] Inventors: Keiichi Yamamoto, Okazaki; Kazuo Ishikawa, Hoi, both of Japan

[73] Assignee: Aisin Seiki Kabushiki Kaisha, Aichi, Japan

[21] Appl. No.: 23,038

[22] Filed: Mar. 6, 1987

[30] Foreign Application Priority Data

Mar. 7, 1986 [JP] Japan ................... 61-49584

[51] Int. Cl.$^4$ .................. G06F 15/20; B60K 41/22
[52] U.S. Cl. ................. 364/424.1; 74/866; 192/0.092; 192/3.31
[58] Field of Search .......... 364/424.1; 74/866; 192/0.076, 3.31, 0.092

[56] References Cited

U.S. PATENT DOCUMENTS

| | | | |
|---|---|---|---|
| 4,393,467 | 7/1983 | Miki et al. ................. | 74/866 |
| 4,449,618 | 5/1984 | Suga et al. ................. | 74/866 |
| 4,457,410 | 7/1984 | Suga et al. ................ | 192/0.092 |
| 4,503,956 | 3/1985 | Suzuki et al. .............. | 192/0.052 |
| 4,509,124 | 4/1985 | Suzuki et al. .............. | 364/424.1 |
| 4,539,869 | 9/1985 | Suga et al. ................. | 74/866 |
| 4,580,671 | 4/1986 | Matsuoka et al. .......... | 192/0.076 |
| 4,618,041 | 10/1986 | Sotoyama et al. ......... | 192/0.076 |
| 4,640,394 | 2/1987 | Higashi et al. ............. | 192/0.092 |
| 4,687,083 | 8/1987 | Sotoyama et al. ......... | 192/0.076 |

Primary Examiner—Parshotam S. Lall
Assistant Examiner—V. N. Trans
Attorney, Agent, or Firm—Sughrue, Mion, Zinn, Macpeak & Seas

[57] ABSTRACT

A lockup control system for a torque converter with a directly coupled clutch is disclosed. A gear ratio of the torque converter is detected as is a throttle valve opening. A gear ratio data (as a reference data) which is previously assigned to a throttle valve opening is read from ROM, and is compared against the detected gear ratio. If the latter is equal to or greater than the former, a lockup command is provided, and a prevailing vehicle speed is written into a register. When a lockup condition is established, the current vehicle speed is compared against the vehicle speed stored in the register, and whenever the former becomes equal to or less than the latter from which $\Delta V$ is subtracted, the lockup is terminated. Reference data is provided in three groups corresponding to three temperature regions of the torque converter. A group corresponding to the actual temperature of the torque converter is selected, and reference data in the group which corresponds to a particular throttle opening is read from ROM. $\Delta V$ is a function of the throttle opening, and assumes a smaller value for an increased throttle opening and assumes a greater value for a reduced throttle opening.

8 Claims, 7 Drawing Sheets

LOCKUP CONTROL SYSTEM FOR AUTOMATIC TRANSMISSION

FIELD OF THE INVENTION

The invention relates to a lockup control system for an automatic transmission which includes a torque converter and a directly coupled clutch.

PRIOR ART

An automatic transmission including a torque converter enables a smooth starting, acceleration and speed change of a vehicle. A fluid coupling is established when a vehicle load is low and when the number of revolutions of an engine is high. Under this condition, a power loss due to a slip in the automatic transmission increases, causing a temperature rise of a working fluid of the torque converter and an increase in the fuel cost. To accommodate for this, a directly coupled clutch is provided in the automatic transmission so that an output shaft of the engine is directly coupled to an input shaft of a change gearing (i.e., lockup) in a range of operation where the fuel cost increases.

A lockup control of the kind described is disclosed in U.S. Pat. No. 4,393,467 issued to Nobuaki Miki et al, for example. In the lockup control disclosed in this patent, a comparison is made in each of a second to a fourth speed range between a running vehicle speed or the number of revolutions of an output shaft of an automatic transmission and predetermined values to activate the lockup and to terminate it, which correspond to a throttle valve opening, respectively, and if the vehicle speed is equal to or greater than a value of the vehicle speed which is predetermined to activate the lockup, the directly coupled clutch is activated (lockup) while when the vehicle speed becomes equal to or less than a value of the vehicle speed which is predetermined to terminate the lockup, the directly coupled clutch is deactivated (or terminate the lockup).

Specifically, speed ratios e of a torque converter are experimentally determined in a manner corresponding to the throttle valve opening in order to improve the driving performance and to reduce the fuel cost, and values of the vehicle speed to activate and to terminate the lockup which nearly approximate these values of the speed ratio are initially stored in a read only memory (ROM). A speed ratio e represents the ratio of the rotational speed of an input shaft of a change gearing or the rotational speed of the output shaft of the torque converter to the rotational speed of the engine or the rotational speed of the input shaft of the torque converter. An electronic circuit compares a vehicle speed against values of the vehicle speed which are predetermined to activate or terminate the lockup and which are stored in ROM (reference data) in order to determine the necessity to activate the lockup. However, because reference data is provided as discrete digital values which are selected in a rough manner, when examined closely, the lockup control result in driving the vehicle under a high fluid coupling condition (the lockup is activated with a low speed ratio) at one time or driving the vehicle with a low torque lockup (with a speed ratio of 1 and with a low output torque from the engine) at another time. In the former instance, the fuel cost increases, and the temperature of the torque converter rises. In the latter instance, the accelerating capability of the vehicle becomes degraded.

Specifically, at low speed ratios, the input shaft of the torque converter or the output shaft of the engine has a high torque while its output shaft or the input shaft of the change gearing has a low torque, with a differential therebetween being dissipated as a heat loss (an increase in the fuel cost) by causing a temperature rise of working fluid within the torque converter. When the vehicle is driven with a low torque lockup (with a speed ratio of 1 and the low output torque), the engine may be overloaded.

Obviously, an excessive temperature rise of working fluid of the torque converter is unfavorable to the operation of the torque converter itself, and in addition, it causes a temperature rise of the change gearing also by producing a temperature rise of a working fluid in the gearing. A speed change response, namely, the time required from the energization of a speed range selecting valve which may be a solenoid valve, for example, to the actual shifting to a new speed range, varies with the temperature of the working fluid of the change gearing. In an automatic transmission including a directly coupled clutch associated with the torque converter to enable a lockup (or a direct coupling between the engine and the change gearing), the lockup is terminated before a speed change is made, after which the lockup is activated again if it is required. However, if the speed change response fluctuates, the termination or activation of the lockup cannot be properly timed with respect to the mechanical shift between the speed ranges, and an improper timing may cause impacts being transmitted to the torque converter and the change gearing. Such impacts produce mechanical percussion sounds and are also transmitted to a car body, which then oscillates. In addition, such impacts cause an excessive temperature rise of working fluid of the torque converter and increases mechanical abrasion of the torque converter and the change gearing, or the automatic transmission, accompanied with its aging effect, resulting in a variation in the operating response of the automatic transmission. Such variation may result in an up shift to a higher speed range or a lockup (activation of the directly coupled clutch) under a high load condition which may cause a variation in the torque from the engine, whereby the engine may be subject to a knocking phenomenon.

SUMMARY OF THE INVENTION

It is an object of the invention to provide an improved lockup control system in which a lockup control is more precisely timed with a driving response or performance of a vehicle, and which reduces a temperature rise of working fluid of a torque converter used in an automatic transmission while simultaneously improving an accelerating capability of the vehicle.

The above object is accomplished by a lockup control system for an automatic transmission which includes a torque converter having its input shaft coupled to an output shaft of an onboard engine, a directly coupled clutch which provides a direct connection between the input shaft and the output shaft of the torque converter, a change gearing having its input shaft coupled to the output shaft of the torque converter, and lockup activate means which selectively turns the directly coupled clutch on and off. The lockup control system comprises first speed detecting means for detecting the rotational speed of at least one of an input and an output shaft of the change gearing; second speed detecting means for detecting the rotational speed of the output shaft of the engine; speed ratio detecting means responsive to the rotational speeds detected by the first and the second speed detecting means for determining a ratio of the rotational speed of the output shaft relative to the rotational speed of the input shaft of the torque converter; means for producing a signal representing an operating status of the engine; reference information storage means for storing information which is to be referred to when determining the activation of the lockup as a function of the operating engine status; lockup command means for reading reference information which corresponds to the operating engine status from the storage means, for comparing the ratio of the rotational speed of the output shaft relative to the rotational speed of the input shaft of the torque converter against the reference information which is read from the storage means and for providing a lockup command to the lockup activate means whenever the ratio is equal to or greater than the reference information; memory means for storing the rotational speed which is detected by the first speed detecting means at the time the lockup command is provided; and unlock command means for comparing the rotational speed detected by the first speed detecting means against the rotational speed stored in the memory means from which a preset value is subtracted, and for providing an unlock command to the lockup activate means whenever the first mentioned rotational speed is equal to or less than the latter value.

With this arrangement, the activation of the lockup is controlled in accordance with the speed ratio of the torque converter, allowing a temperature rise within the torque converter as well as a degradation in the accelerating capability of the vehicle to be prevented in a satisfactory manner. More specifically, the speed ratio e represents the rotational speed $V_0$ of the output shaft of the torque converter over the rotational speed of the input shaft of the torque converter or the rotational speed $V_e$ of the engine. Where the rotational speed $V_0$ of the output shaft of the torque converter is directly detected by a rotational speed detector, another rotational speed detector associated with the engine may be provided, and the speed ratio e may be derived as $e = V_0/V_e$.

The rotational speed $V_0$ of the output shaft of the torque converter represents the rotational speed of the input shaft of the change gearing, which can be calculated from the rotational speed Vsp of the output shaft of the change gearing (which is commonly referred to as a vehicle speed, and is actually proportional to a vehicle speed in the absence of a wheel slip) and from the gear ratio Rg of the change gearing. Specifically, the rotational speed $V_0$ of the input shaft of the change gearing is given by $V_0 = k \, Rg \cdot Vsp$ where k represents a constant determined by a particular speed range of the change gearing. Accordingly, $$e = V_0/Ve \quad (1)$$
$$= k \, Rg \cdot Vsp/Ve$$
$$= K \cdot Vsp/Ve$$

where K represents a constant determined by a particular speed range (from first to fourth speed ranges) of the change gearing. The speed ratio e of the torque converter can be determined according to the equation (1) utilizing a speed sensor (detecting Vsp) which is coupled to a normally provided vehicle speedometer cable and a speed sensor which detects the rotational speed Ve of the engine. In a preferred embodiment of the invention which will be described later, the speed ratio e is calculated according to the equation (1).

The relationship of the torque ratio and the heat value within the torque converter with respect to the speed ratio e thereof is graphically shown in FIG. 2a. As illustrated, the heat value is at its maximum as is the torque ratio at speed ratio e=0. As the speed ratio e increases, the heat value decreases as does the torque ratio. The heat value substantially reaches its minimum value at speed ratio e of 0.85 where the torque ratio is substantially equal to 1. It will be seen from this relationship that the use of the lockup at the speed ratio e of 0.85 or greater provides an accelerating response which is similar to or better than that obtained under the fluid coupling condition (without the lockup). Under the fluid coupling condition, the heat value within the torque converter increases from the minimum value obtained at speed ratio of 0.85, as the speed ratio e further increases, and has another peak in a region of speed ratios from 0.95 to 1.00. The use of the lockup for speed ratios of approximately 0.85 and higher substantially eliminates the heat value within the torque converter, and thus it will be seen that the lockup can be used preferably at the speed ratio of 0.85 and higher from the standpoints of the accelerating capability of the vehicle and the heat value within the torque converter.

Consequently, a speed ratio $e_L$ to activate the lockup is established and is stored in a memory, as indicated at RRM in FIG. 2b. A different value of such speed ratio is used as a function of a throttle opening in order to maintain the fluid coupling condition (without the lockup) to as high a speed ratio as possible since the throttle opening corresponds to the available power from the engine and when it is high, the lockup condition would result in the liability that the engine may be highly loaded in response to a variation in the running road condition or a variation in the throttle opening.

In accordance with the invention, the speed ratio e is calculated during the time the vehicle is running, and an RRM value which corresponds to a particular throttle opening is read from the memory. By comparing the actual speed ratio e against the read value (RRM), the lockup is established for $e \geq RRM$. The speed ratio e=1 (constant value) is reached as a result of the lockup, and the speed ratio e is no longer available to determine the need to terminate the lockup. For this reason, a value of the vehicle speed Vsp, $V_{Lu}$, which prevails when the lockup is established, is stored in a memory. The subsequent vehicle speed Vsp is compared against the stored value $V_{Lu}$, from which a preset value $\Delta V$ is subtracted, or $V_{Lu} - \Delta V$, and the lockup is terminated if it is found that $Vsp \leq (V_{Lu} - \Delta V)$. Specifically, referring to FIG. 2c, when the lockup is established at $V_{Lu}$, the lockup is terminated at $V_{Lu} - \Delta V$. The purpose of providing such a hysteresis by an amount of $\Delta V$ is to prevent a hunting effect at the boundary of $V_{Lu}$ if the lockup is terminated as soon as the vehicle speed becomes less than $V_{Lu}$.

It is preferred that the magnitude of $\Delta V$ be chosen in accordance with the operating status of the engine or throttle opening. Specifically, when a high throttle opening is used or when the engine is providing a high output, this means that the vehicle is running with an increased load, and hence it is desirable that a smaller value be used for $\Delta V$. Accordingly, in a preferred embodiment of the invention, the magnitude of $\Delta V$ is chosen in a manner corresponding to the throttle opening and is stored in a memory, as indicated by a solid line curve RMO in FIG. 2d. Thus, whenever the lockup is established, a value of ΔV which corresponds to the throttle opening is read from memory RMO, and is subtracted from the value $V_{Lu}$ which has been stored in a memory when the lockup is established. The vehicle speed Vsp is then compared against $V_{Lu}-\Delta V$, and the lockup is terminated if it is found that $Vsp \leq (V_{Lu}-\Delta V)$. When a smaller value is chosen for ΔV, as indicated by a phantom line curve RMC in FIG. 2d, the region of ΔV in which the lockup remains effective is reduced, providing an increased probability that the fluid coupling of the torque converter produces a smooth running condition with a torque response which is balanced with a running condition. In this manner, the running response may be changed. By way of example, such response may be changed according to the intention of a driver or according to the running condition, in particular, the vehicle load or according to the inclination of the down or up slope. For this reason, in a preferred embodiment of the invention, a response selection switch (RMS) is provided to select either RMO or RMC.

It will be seen that an excessive temperature rise of the torque converter can be prevented by moving the speed ratio $e_L$ where the lockup is established toward a lower value or by increasing the extent in which the lockup is effective. Thus, in a preferred embodiment of the invention, means is provided for detecting the temperature of the torque converter, and a plurality of sets of speed ratio $e_L$ which is referred to in determining the need to activate the lockup are provided. A particular one set is chosen in response to a detected temperature of the torque converter, and is used as a reference to determine the need to activate the lockup. As shown in FIG. 2b, three sets RRL, RRM and RRH are used for the speed ratio $e_L$. RRL is used as a reference when the torque converter exhibits a low temperature, RRM is used as a reference for a medium temperature, and RRH is used as a reference at elevated temperatures. It will be appreciated that a temperature rise is of no concern at low temperatures of the torque converter, and hence RRL is preset to a high value so that the fluid coupling may be fully effective. At medium temperatures, the temperature rise must be suppressed to a degree while taking advantage of the fluid coupling, and thus RRM is at a slightly reduced level. At elevated temperatures, the temperature rise must be suppressed to a greater degree, and hence RRH is set at a further reduced level. Thus, as the temperature of the torque converter increases, the region in which the lockup is activated is extended in a direction to reduce the heat value within the torque converter.

Above and other objects and features of the invention will become apparent from the following description of an embodiment thereof with reference to the drawings.

BRIEF DESCRIPTION OF THE DRAWINGS

FIG. 1b is a block diagram of a shift controller shown in FIG. 1a;

FIG. 2a graphically shows the relationship of the heat value and the torque ratio with respect to the speed ratio of the torque converter shown in FIG. 1a;

DESCRIPTION OF PREFERRED EMBODIMENT

Figure 1A:
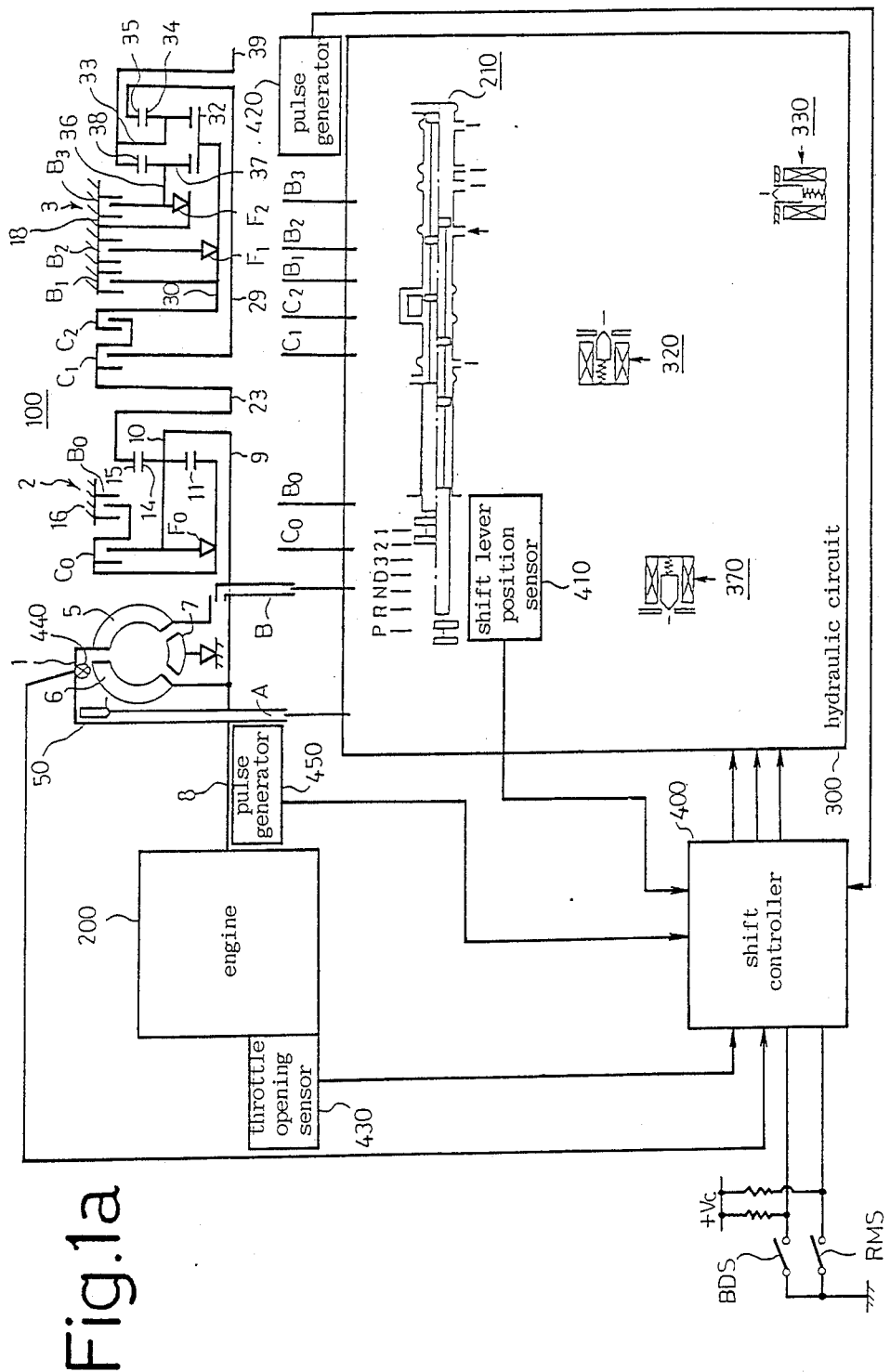
FIG. 1a is a block diagram of a general arrangement of one embodiment of the invention.

A general arrangement of one preferred embodiment of the invention is illustrated in FIG. 1a, and includes an automatic transmission 100 and a hydraulic circuit 300 which controls the transmission, both of which remains the same as those disclosed in U.S. Pat. No. 4,393,467 cited above.

Specifically, the automatic transmission 100 is a fluid operated transmission with an overdrive, and includes a torque converter 1 having a directly coupled clutch 50 associated therewith, an overdrive mechanism 2 and 3 forward/1 reverse stage, change gearing 3. The torque converter 1 is well known in itself and includes a pump 5, a turbine 6 and a stator 7, with the pump 5 being connected to a crankshaft or an output shaft 8 of an engine and the turbine 6 connected to a turbine shaft 9, which represents an output shaft of the torque converter 1 and which also represents an input shaft of the overdrive mechanism 2. Thus, within the overdrive mechanism 2, the turbine shaft 9 is connected to a carrier 10 of a planetary gearing. A directly coupled clutch 50 is disposed between the crankshaft 8 and the turbine shaft 9 to provide a mechanical interconnection therebetween whenever the clutch is operated. A planetary pinion 14 is rotatably carried by the carrier 10 and is in meshing engagement with a sun gear 11 and a ring gear 15. Disposed between the sun gear 11 and the carrier 10 are an overdrive multiple disc clutch $C_0$ and an overdrive one-way clutch $F_0$, and an overdrive multiple disc brake $B_0$ is disposed between the sun gear 11 and a housing or an overdrive casing 16 which contains the overdrive mechanism.

The ring gear 15 of the overdrive mechanism 2 is connected to an input shaft 23 of the change gearing 3. A front multiple disc clutch $C_1$ is disposed between the input shaft 23 and an intermediate shaft 29 while a reverse multiple disc clutch $C_2$ is disposed between the input shaft 23 and a sun gear shaft 30. Disposed between the sun gear shaft 30 and a transmission casing 18 are a multiple disc brake $B_1$ and a multiple disc brake $B_2$ in tandem relationship with a one-way clutch $F_1$. A sun gear 32 is mounted on the sun gear shaft 30, and defines a pair of epicyclic gearings together with a carrier 33, a planetary pinion 34 carried by the carrier 33, another carrier 36, another planetary pinion 37 carried by the carrier 36 and a ring gear 38 in meshing engagement with the pinion 37. In one epicyclic gearing, the ring gear 35 is connected to the intermediate shaft 29, and the carrier 33 of this gearing is connected to the ring gear 38 of the other epicyclic gearing, with both the carrier 33 and the ring gear 38 being connected to an output shaft 39. Disposed between the transmission casing 18 and the carrier 36 of the other epicyclic gearing are a multiple disc brake $B_3$ and a one-way clutch $F_2$.

In the hydraulic automatic transmission 100 with overdrive mentioned above, the various clutches and brakes are either engaged or disengaged by the hydraulic circuit 300 in accordance with an output from the engine 200 or a corresponding throttle opening and the vehicle speed or the rotational speed of the output shaft 39, thus shifting the vehicle speed to one of four forward speed ranges including the overdrive (O/D) or manually to the single reverse speed range.

Table 1 below indicates operating conditions of the various clutches and brakes in response to a particular shift gear position of a manual shift valve 210.

noid valves 320, 330 and 370, thus controlling the shift operation and the lockup condition of the automatic transmission 100. The shift controller 400 also receives an electric pulse which is synchronized with a rotation of the output shaft 39 of the automatic transmission 100, a signal representing a throttle opening of the engine 200, an electric pulse which is synchronized with the rotation of the output shaft of the engine and a signal representing the temperature of working fluid of the torque converter 1 from a pulse generator 420, a throt-

TABLE 1

| shift position | frictional device | | | | | | | | | |
|---|---|---|---|---|---|---|---|---|---|---|
| | clutch $C_0$ | clutch $C_1$ | clutch $C_2$ | brake $B_0$ | brake $B_1$ | brake $B_3$ | brake $B_2$ | one-way clutch $F_0$ | one-way clutch $F_2$ | one-way clutch $F_1$ |
| parking P | o | x | x | x | x | o | x | | | |
| reverse R | o | x | o | x | x | o | x | lock | lock | |
| neutral N | o | x | x | x | x | x | x | | | |
| forward | | | | | | | | | | |
| D-range | | | | | | | | | | |
| 1st | o | o | x | x | x | x | x | lock | lock | overrun |
| 2nd | o | o | x | x | o | x | o | lock | overrun | lock |
| 3rd | o | o | o | x | x | x | o | lock | overrun | overrun |
| O.D. (4th) | x | o | o | o | x | x | o | overrun | overrun | overrun |
| 3-range | | | | | | | | | | |
| 1st | o | o | x | x | x | x | x | lock | lock | overrun |
| 2nd | o | o | x | x | x | x | o | lock | overrun | lock |
| 3rd | o | o | o | x | x | x | o | lock | overrun | overrun |
| 2-range | | | | | | | | | | |
| 1st | o | o | x | x | x | x | x | lock | lock | overrun |
| 2nd | o | o | x | x | o | x | o | lock | overrun | lock |
| L-range | o | o | x | x | x | o | x | lock | lock | overrun | where o represents that a corresponding clutch or brake is engaged while x indicates that it is disengaged.

The hydraulic circuit 300 which selectively operates the clutches $C_0$ to $C_2$, the brakes $B_0$ to $B_3$ and the directly coupled clutch 50 of the automatic transmission 100 to achieve an automatic shift operation is disclosed in U.S. Pat. No. 4,393,467 cited above and is well known in the art, and therefore its arrangement and operation will not be described in detail. As mentioned previously, the hydraulic circuit 300 includes the manual shift valve 210, and it also includes a pair of solenoid valves 320 and 330 which are used to establish a particular speed range. The relationship between a particular speed range selected by a particular combination of the energization or deenergization of these solenoid valves is indicated in Table 2 below.

TABLE 2

| | position of valve 210 | | | | | |
|---|---|---|---|---|---|---|
| | | D | | | | |
| speed range selected | N | 1st | 2nd | 3rd | 4th | R |
| solenoid valve 320 | deen* | en** | en | deen | deen | en |
| solenoid valve 330 | deen | en | deen | en | deen | deen |

*"deen" stands for "deenergized";
**"en" stands for "energized".

The hydraulic circuit 300 also includes a solenoid valve 370 which is used to establish a lockup condition. When it is energized, the directly coupled clutch 50 is activated to establish the lockup condition while when it is deenergized, the directly coupled clutch 50 is deactivated to terminate the lockup condition.

The position of the manual shift valve 210 in the hydraulic circuit 300 is detected by a shift lever position sensor 410, which feeds the shift controller 400. The shift controller 400 includes a microprocessor which controls the energization or deenergization of the soletle opening sensor 230, a pulse generator 450 and a temperature sensor 440, respectively.

Figure 1B:
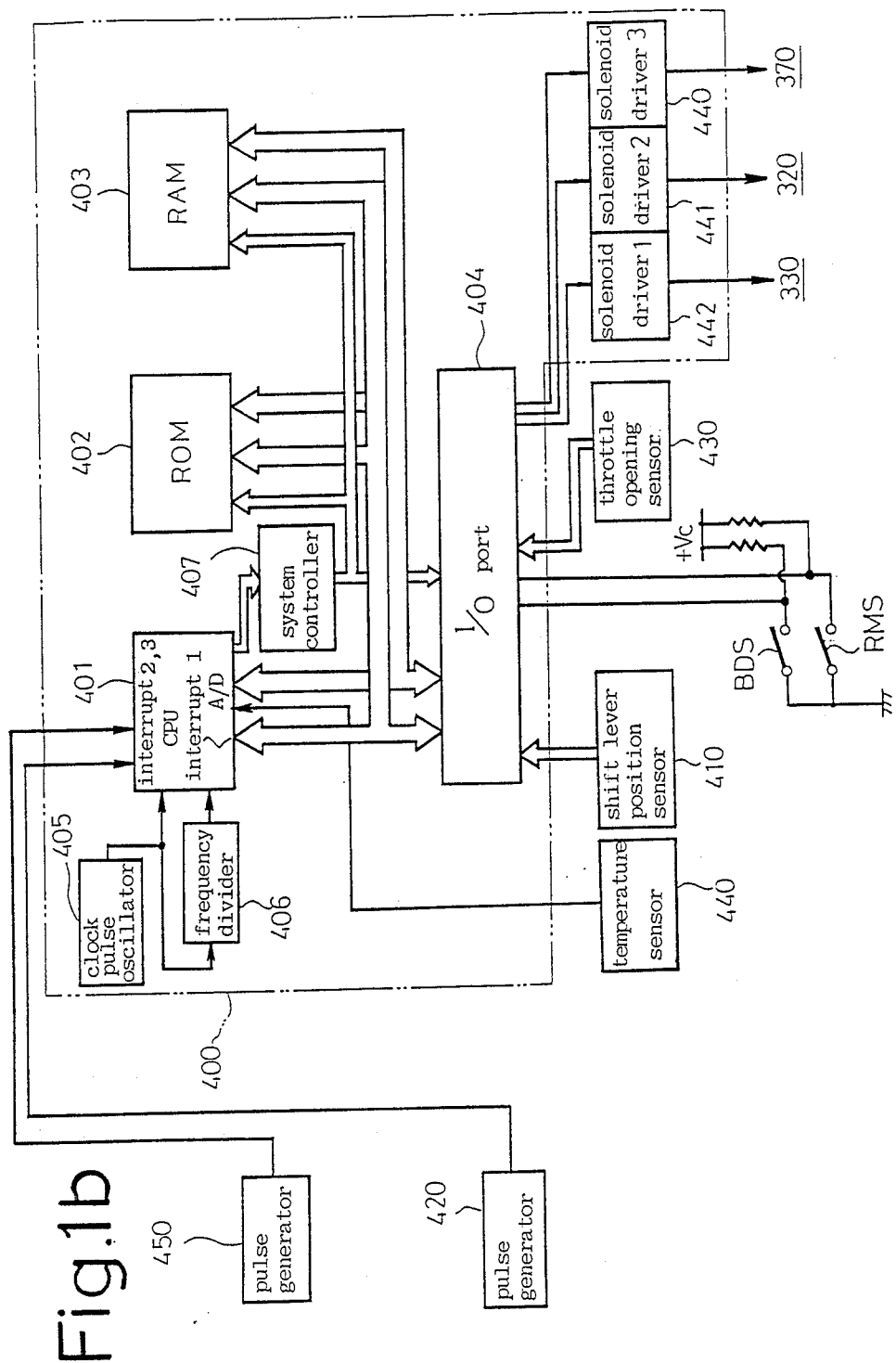

FIG. 1b shows the shift controller 400 in more detail. The controller is substantially similar to a known shift controller which is disclosed in U.S. Pat. No. 4,393,467. A decision to perform a shift operation as well as a controlling function of the shift controller remain the same, except that the pulses developed by the pulse generators 420 and 450 are fed to interrupt ports to enable a calculation of a vehicle speed Vsp (the rotational speed of the output shaft 39) and the rotational speed Ve of the engine, that a brake depression detecting switch BDS and a lockup terminate response selecting switch RMS are connected to associated ports, that an analog temperature signal from the temperature sensor 440 is fed to an A/D conversion port to enable the entry of digital temperature data, and that a different lockup activate/terminate program is used in its operation.

More specifically describing the arrangement shown in FIG. 1b, the shift controller 400 essentially comprises a microprocessor 401, and also includes a read only memory (ROM) 402 which permanently stores a program which controls the logical operation of the microprocessor and sundry data, a random access memory (RAM) 403 which stores data read from ROM 402 and temporary input/output data, an input/output port unit 404, a clock pulse oscillator 406, a system controller 407 and solenoid drivers 440, 441 and 442 which energize the solenoid valves 320, 330 and 370, respectively.

A clock pulse from the oscillator 405 is applied to a clock input of various devices 401 to 403 and 406. A frequency divider 406 divides the frequency of the clock pulse before it is applied to an interrupt terminal 1 of CPU 401. Each time a clock pulse appears at the terminal 1, CPU 401 executes an interrupt processing operation 1. In the interrupt processing operation 1, CPU 401 detects a change in a running condition as that from running on a flat road to running on a slope or vice versa while examining the current running condition of the vehicle, and alters terms for a decision to lock or switch a speed range in a corresponding manner. Thus, the grade of a slope or a vehicle load is detected by the interrupt processing operation 1. This detection takes place in the same manner as that disclosed in U.S. Pat. No. 4,393,467.

ROM 402 contains a program which is executed to perform the interrupt processing operation 1, and also contains other programs as well as reference data which are used in the decision or detection thereof; including a speed range determining program combined with reference data which is used when running on a flat road, a speed range shifting program and a slope running detecting program combined with its reference data, a speed range shift inhibit program and uninhibited program combined with reference data which are used in the decision and detection thereof, a temporary lockup terminate program which is used during a shifting operation and a throttle opening responsive acceleration detecting program and constants data which are used during the execution thereof. These programs and associated data are disclosed in U.S. Pat. No. 4,393,467.

Reference data stored in ROM 402 and which is used in controlling the shift operation remain the same as that disclosed in U.S. Pat. No. 4,393,467, but to enable the implementation of the present invention, the shift controlling program is modified and a novel lockup activate/terminate controlling program according to the invention as well as reference data which is used during the execution thereof are also stored in ROM 402 (see FIGS. 2b and 2d).

Referring to the flowcharts shown in FIGS. 3a to 3c, the operation of CPU 401 to control the shifting operation as well as the lockup condition on the basis of the control program and reference data stored in ROM 402 will now be described.

Figure 3A:
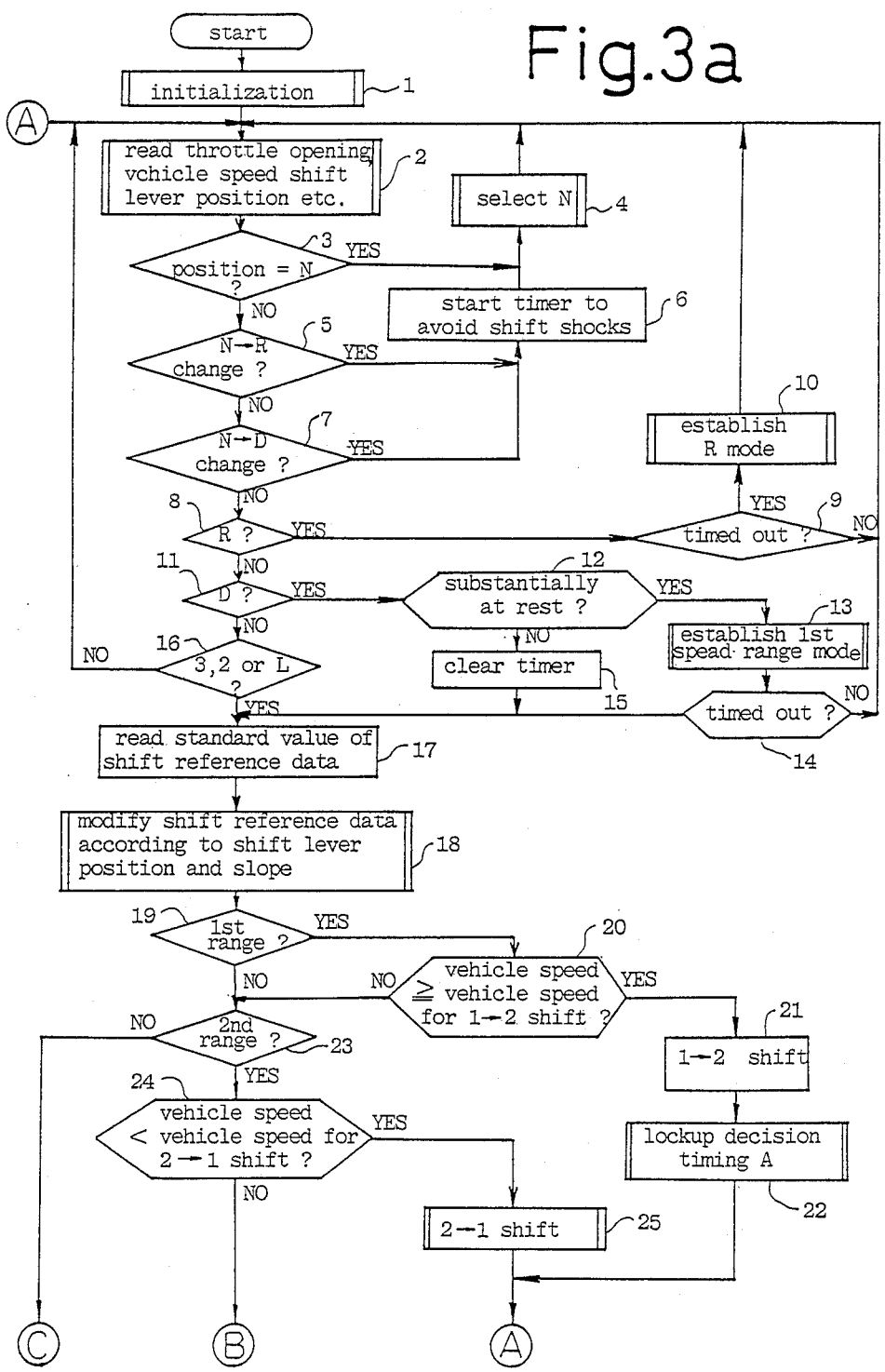
FIGS. 3a, 3b and 3c are a series of flowcharts illustrating the shift controlling and the lockup controlling operation by CPU shown in FIG. 1b.

Referring to FIG. 3a, when the power supply is turned on, CPU 401 clears all registers and internal counters and sets various ports of the input/output port unit 404 at their standby levels, and then reads the signal from the shift lever position sensor 410 (step 1; in the description to follow, a number in parentheses represents a step number).

Interrupts 1, 2 and 3 are enabled. Upon entering the control operation, the microprocessor reads the throttle opening (an output from the sensor 230), the shift lever position (an output from the sensor 410), the vehicle speed Vsp, the rotational speed Ve of the engine, the temperature of the torque converter COT, and the open/closed status of the switches VDS and RAMS (2). The pulse generator 420 is formed by a rotary encoder which is coupled to the output shaft 39, and the pulse generator 450 is formed by a rotary encoder coupled to the output shaft of the engine. After the interrupt is enabled, each time a pulse representing the detected vehicle speed (an output pulse from the pulse generator 420) appears at the interrupt port 2, the microprocessor 401 executes an interrupt processing operation 2, and whenever the pulse count reaches 4, it reads the content of a clock pulse counter 1 (which is an internal counter) to calculate a vehicle speed data Vsp, which is used to update a vehicle speed register Vsp. The clock pulse counter 1 is then cleared as is a pulse counter (a program counter). Specifically, the microprocessor calculates Vsp on the basis of a time interval corresponding to four periods of the vehicle speed detecting pulse (a pulse developed by the pulse generator 420). Each time an engine rotational speed detecting pulse (a pulse developed by the pulse generator 450) appears at the interrupt port 3, the microprocessor 401 executes an interrupt processing operation 3 in which it reads the content of a clock pulse counter 2 (an internal counter) and calculates engine rotational speed data Ve, which is used to update the engine rotational speed register Ve, whereupon the clock pulse counter 2 is cleared. In other words, Ve is calculated on the basis of a time interval corresponding to one period of the engine rotational speed detecting pulse.

After the reading step 2 has been completed, the microprocessor 401 examines the shift lever position. If it is at N, it establishes the automatic transmission N in an N condition in which the solenoid valves 320 and 330 are deenergized (see Table 2) and the solenoid valve 370 is deenergized to terminate the lockup (4). It then returns to the step 2 where it performs a reading operation again. During this reading operation, the shift lever position which has been read before is saved as a previous position while a newly read position is stored as an updated, current position.

When the shift lever position changes from N to R, as determined by a comparison between the previous position and the current position (5), a timer is initially started (6) so that a shifting operation takes place with a time lag of a given length in order to prevent shocks during the shifting operation. The same applies to a change of the shift lever position from N to D (7). The microprocessor thus returns to the step 2 to perform a reading operation again. When the shift lever position is at R or when the previous position and the current position are both at R (8), indicating that the timer has already been started, it is examined whether the timer has timed out (9). If it has timed out, there has passed a sufficient time to cover a time lag for the oil pressure if the shift lever position has been changed from a position other than R to a position R through a position N, preventing shocks from occurring as a result of the shifting operation, and accordingly the automatic transmission 100 is allowed to be established in its R mode (see Table 2). When the shift lever position is at D (11), it is examined to see whether or not the vehicle is substantially at rest (12). It is determined that the vehicle is substantially at rest if the throttle opening is equal to zero and the vehicle speed is equal to or less than 5 km. If the vehicle is found to be substantially at rest, the automatic transmission is established in its first speed range mode (see Table 2) where the solenoid valves 320 and 330 are energized. It is then examined to see if the timer has timed out (14), and if it has not timed out, the microprocessor waits for the timer to time out (14) or for the vehicle to run in the first speed range (12). If either condition applies, the program proceeds to a portion of the shift control which begins with step 17, because a subsequent shifting operation cannot cause the occurrence of shocks or an engine stop. The shift control beginning with the step 17 is entered from any forward position (D 3, 2 or L range) of the shift lever.

At step 17 of the shift control, standard data which is to be referred to when determining the need for a shifting operation, namely, vehicle speeds for an up shift and a down shift between the various speed ranges and corresponding to different values of the throttle opening when the vehicle is running on a flat road, is read from ROM 402 (17). The standard data is modified in accordance with the prevailing shift lever position and the grade of a slope which has been detected during the previous interrupt operation to produce a shift reference data, which is then written into RAM 403 (18). A shifting operation takes place by specifying particular data corresponding to a current speed range and throttle opening from among shift reference data which has been prepared in the manner mentioned above at step 18, or specifically, a vehicle speed for an up shift or a down shift, and comparing the current vehicle speed against the vehicle speed for either an up shift (20, 26, 58) or against a vehicle speed for a down shift (24, 52, 65). If the prevailing vehicle speed is equal to or greater than the vehicle speed for an up shift, an up shift occurs (21, 30, 62). Conversely, if the prevailing vehicle speed is less than the vehicle speed for a down shift, a down shift occurs (25, 56, 69). It will be appreciated that shocks may be developed during the shifting operation if the lockup condition is established during such up or down shift. Accordingly, the occurrence of such shocks is prevented by initially terminating the lockup, followed by an up shift or a down shift with a given time lag thereafter. A decision whether the lockup is or is not to be established is made at a given time delay after the completion of the shifting operation (22, 29, 31, 55, 45, 57, 63, 68 and 70). The shift control summarized above is disclosed in detail in U.S. Pat. No. 4,393,367 cited above and is well known in the art.

Figure 2A:
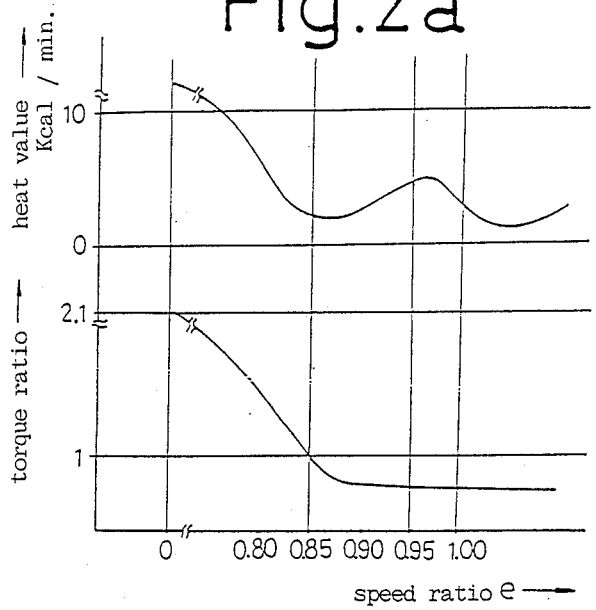
Figure 2B:
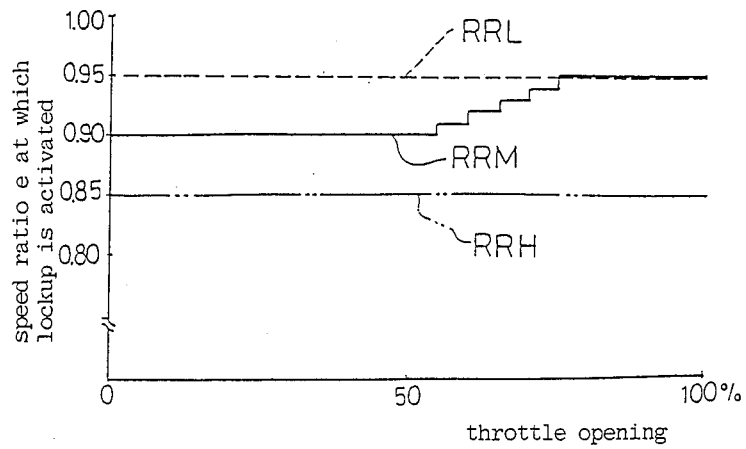
FIG. 2b graphically shows reference data which is used in the determination to activate the lockup by CPU shown in FIG. 1b.
Figure 2C:
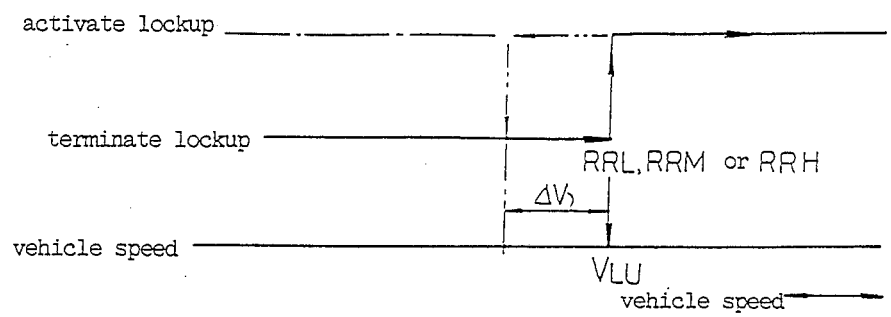
FIG. 2c graphically shows vehicle speeds at which the lockup is activated and terminated relative to the actual vehicle speed.
Figure 2D:
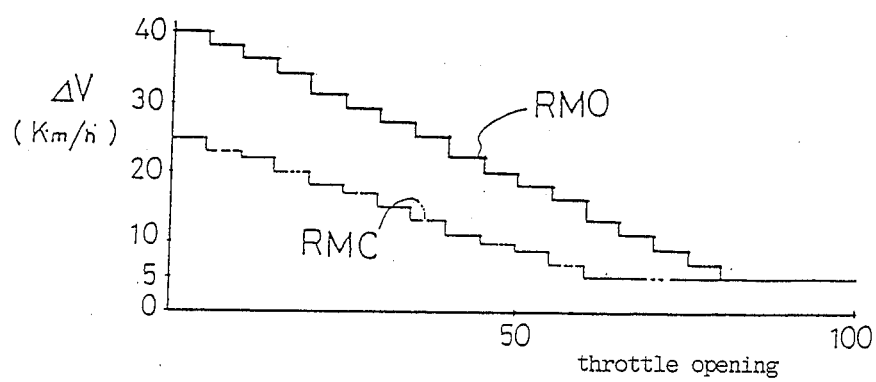
FIG. 2d graphically shows a difference between the vehicle speed at which the lockup is activated and the vehicle speed at which the lockup is terminated as a function of the throttle opening.

A region in each speed range for which the lockup is preferred is indicated by speed ratios which are disposed above curves RRL, RRM and RRH shown in FIG. 2b which are available when the temperature of the torque converter is low, medium or high, respectively. Accordingly, the lockup is established for speed ratios which are located above these curves, and the prevailing value $V_{Lu}$ of the vehicle speed Vsp is stored in a memory, and after the lockup has been activated, Vsp is compared against ($V_{Lu}$−RMO or RMC), and the lockup is terminated if it is found that Vsp≦($V_{Lu}$−RMO or RMC).

Figure 3B:
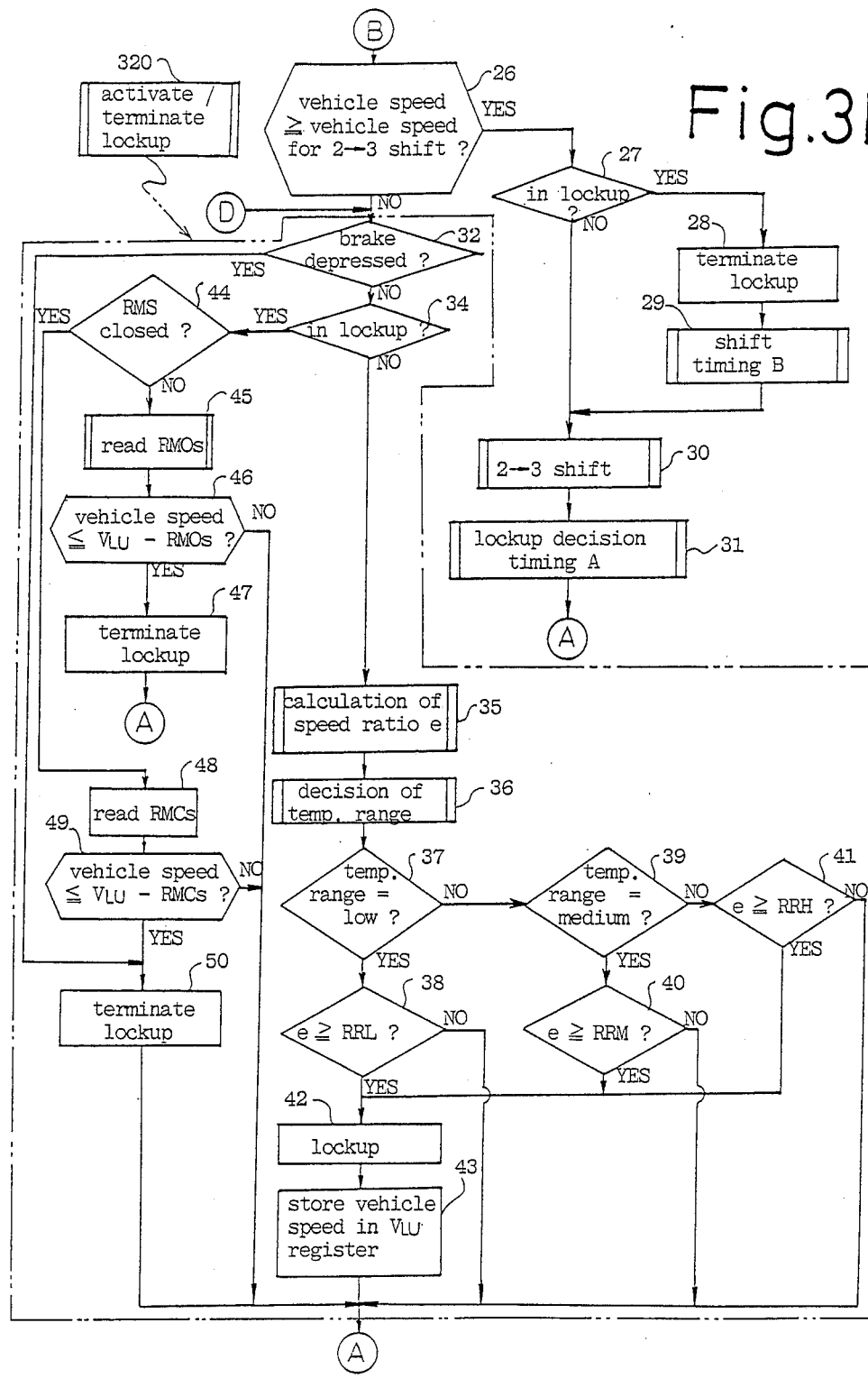
Figure 3C:
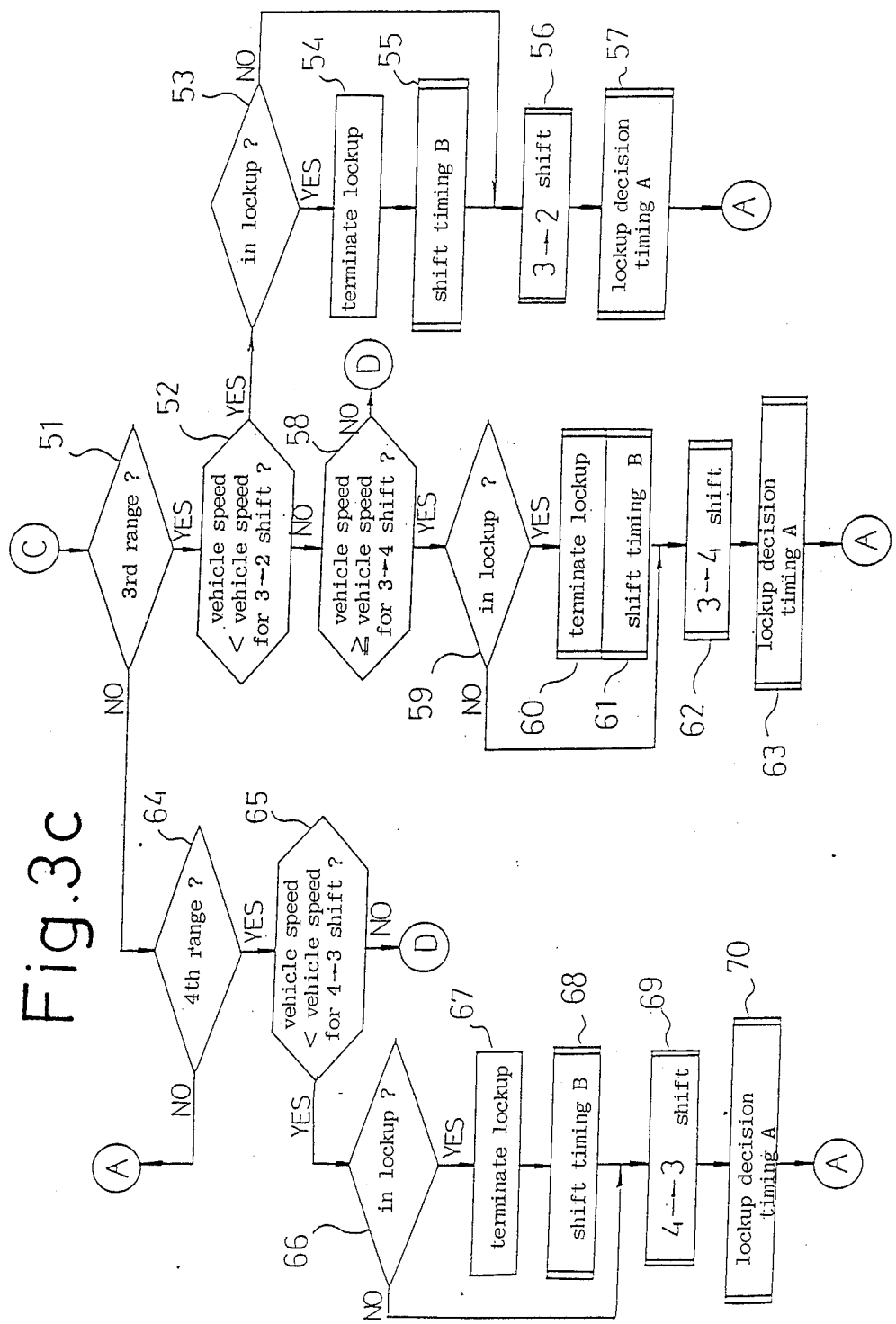

The lockup is activated or terminated by the execution of step 320 (or specifically, steps 32 to 43) shown in FIG. 3b. Specifically, the status of the brake depression detecting switch BDS is initially examined (32), and if it is found that the brake is being depressed (or switch BDS being closed), the lockup is terminated since the wheels are being braked (33). If it is found that the brake is not being depressed (or switch BDS being open), a decision is made to see if the lockup is being established (34). This is determined by seeing if the solenoid valve 370 is or is not energized. If the lockup is not established, the speed ratio e is calculated (35). At this end, the particular speed range from the first to the fourth speed range which is now being used is examined, and a K value (see the equation (1) which corresponds to this speed range is specified and is used in the calculation of the speed ratio e according to the equation (1).

The temperature COT of the torque converter 1 is then examined to determine a particular temperature range (36). For COT≦30° C., "low temperature" data is stored in a temperature range register; for 35° C.≦COT≦50° C., "intermediate temperature" data is stored in the temperature range register; and for 60° C.≦COT, "high temperature" data is stored in the temperature range register. For 30° C.<COT<35° C. or 50° C.<COT<60° C., the content of the temperature range register is not changed. In the event no data is stored in the temperature range register (which occurs immediately after the initialization step 1), low temperature data is stored in the register. Consequently, as COT rises, the content of the temperature range register corresponds to a low temperature for COT<35° C., to an intermediate temperature for 35° C.<COT<60° C., and to a high temperature for 60° C.≦COT. Conversely, as COT falls, the content of the register corresponds to a high temperature for 50° C.<COT, to an intermediate temperature for 30° C.<COT≦50° C., and to a low temperature for COT≦30° C. The purpose of providing a hysteresis response in the determination of the temperature range is to prevent a frequent crossing when COT is located adjacent to the boundary.

When the temperature range has been determined (36), a particular group of lockup reference data which corresponds to the temperature range, thus either RRL for low temperature, RRM for intermediate temperature or RRH for high temperature, is specified, and specific data in the specified group which corresponds to the prevailing throttle opening is read, and is compared against the calculated speed ratio e (37 to 40). If the speed ratio e is equal to or greater than the read value, the lockup is established (42: Specifically, a high level H is established at an output port leading to the solenoid driver 3), and the prevailing vehicle speed Vsp is stored in $V_{Lu}$ register (43).

If it is found at step 34 or upon entering lockup activate/terminate routine that the lockup is established, the status of the unlock response selecting switch 44 is initially examined (44). If the switch is open, the unlock reference data group RMO (FIG. 2d) is specified, and making reference to the prevailing throttle opening, a value RMOs in the group RMO and corresponding to the throttle opening is read (45). The prevailing vehicle speed Vsp is compared against ($V_{Lu}$−RMOs) (46). It will be understood that $V_{Lu}$ represents the content of $V_{Lu}$ register. If it is found that the vehicle speed Vsp≦($V_{Lu}$−RMOs), the lockup is terminated (47: Specifically, an L level is set at an output port to the solenoid driver 440). If it is found that the vehicle speed Vsp>($V_{Lu}$−RMOs), the lockup is maintained.

When it is found at step 44 that the unlock response selecting switch 44 is closed, the unlock reference data group RMC (FIG. 2d) is specified, and the value RMCs in the group RMC and corresponding to the prevailing throttle opening is read (48). The prevailing vehicle speed Vsp is compared against ($V_{Lu}$−RMCs) (49). If it is found that the vehicle speed Vsp≦($V_{Lu}$−RMCs), the lockup is terminated (50: Specifically, an L level is set at an output port to the solenoid driver 440). If it is found that the vehicle speed Vsp>($V_{Lu}$−RMCs), the lockup is maintained. The described lockup activate/terminate step 320 is executed in the second, the third and the fourth speed range.

From the foregoing, it will be understood that the lockup is activated on the basis of the speed ratio by detecting the speed ratio of the torque converter, with the torque response and the heating response of the torque converter being balanced and in a relatively smooth manner which is free from any influence of shocks accompanied with the activation of the lockup.

What is claimed is:

1. A lockup control system for an automatic transmission including a torque converter having its input shaft coupled to an output shaft of an onboard engine, a directly coupled clutch which provides a direct connection between the input and the output shaft of the torque converter, a change gearing having its input shaft coupled to the output shaft of the torque converter and lockup activate means for turning the directly coupled clutch on or off;

the lockup control system comprising first speed detecting means for detecting the rotational speed of at least one of the input and the output shaft of the change gearing;

second speed detecting means for detecting the rotational speed of the output shaft of the onboard engine;

means for detecting a ratio of the rotational speed of the output shaft over the rotational speed of the input shaft of the torque converter on the basis of the rotational speeds of the change gearing and the engine;

means for generating an engine status signal representing an operating status of the engine;

means for storing information which is to be referenced when determining the activation of the lockup and which corresponds to an engine operating status;

means for reading the reference information which corresponds to a particular engine operating status;

lockup command means for comparing a ratio of the rotational speed of the output shaft over the rotational speed of the input shaft of the torque converter against the reference information which is read out and for providing a lockup command to the lockup activate means whenever the ratio is equal to or greater than the reference information;

memory means for storing the rotational speed of the change gearing which is detected by the first speed detecting means at the time of the lockup command;

and lockup terminate command means operative to compare the rotational speed detected by the first speed detecting means against a rotational speed which is stored in the memory means and from which a preset value is subtracted and to provide a lockup terminate command to rotational speed is less than the latter value.

2. A lockup control system according to claim 1 in which the lockup terminate command means stores a correction value for the rotational speed which is dependent on a n engine operating status so as to select a correction value corresponding to an engine operating status which is detected by the engine status signal generating means as the present value.

3. A lockup control system according to claim 2 in which the lockup terminate command means stores a plurality of sets of correction values for the rotaional speed which are dependent on an engine operating status, specifies a particular one of the sets responsive to a corresponding signal and selects a particular correction value in the specified set for the rotational speed which correspond to an engine operating status which is detected by the engine status signal generating means as the present value.

4. A lockup control system according to claim 3 in which the engine status signal generating means comprises means for detecting a throttle opening of the onboard engine, the first speed detecting means comprises a speed detector which detects the rotational speed of the output shaft of the change gearing, and the means for detecting the speed ratio comprises calculation means responsive to the rotational speed detected by the first speed detecting means, a gear ratio of the change gearing and the rotational speed of the engine to detect a ratio of the rotational speed of the output shaft over the rotational speed of the input shaft of the torque converter.

5. A lockup control system for an automatic transmission including a torque converter having its input shaft coupled to an output shaft of an onboard engine, a directly coupled clutch for providing a direct connection between the input and the output shaft of the torque converter, a change gearing having its input shaft coupled to the output shaft of the torque converter and lockup activate means for turning the directly coupled clutch on and off;

the lockup control system comprising first speed detecting means for detecting the rotational speed of at least one of the input and the output shaft of the change gearing;

means for detecting the temperature of the torque converter;

second speed detecting means for detecting the rotational speed of the output shaft of the engine;

means for detecting a ratio of the rotational speed of the output shaft over the rotational speed of the input shaft of the torque converter on the basis of the rotational speeds detected by the first and the second speed detecting means;

means for generating an engine status signal representing an operating status of the engine;

means for storing information which is to be referenced in order to determine the activation of the lockup and which is dependent on the temperature of the torque converter and the operating status of the engine, the information having an increased value for a higher temperature;

means for reading the reference information which corresponds to a particular temperature detected by the temperature detecting means and a particular engine operating status;

lockup command means for comparing a ratio of the rotational speed of the output shaft over the rotational speed of the input shaft of the torque converter against the reference information which is read out and for providing a lockup command to the lockup activate means whenever the former ratio is equal to or greater than the latter information;

memory means for storing the rotational speed detected by the first speed detecting means at the time of the lockup command;

and lockup terminate command means for comparing the rotational speed as detected by the first speed detecting means against the rotational speed stored in the memory means from which a preset value is subtracted and for providing the lockup terminate command to the lockup activate means whenever the first mentioned rotational speed is equal to or less than the latter value.

6. A lockup control system according to claim 5 in which the lockup terminate command means stores a correction value for the rotational speed which depends on an engine operating status and selects a correction value for the rotational speed corresponding to an engine operating status which is being detected by the engine status signal generating means as the preset value.

7. A lockup control system according to claim 6 in which the lockup terminate command means stores a plurality of sets of correction values for the rotational speed in a manner corresponding to an engine operating status, specifies a particular set in response to a corresponding signal, and selects a particular correction value in the particular set which corresponds to an engine operating status which is detected by the engine status signal generating means as the preset value.

8. A lockup control system according to claim 7 in which the engine status signal generating means comprises means for detecting a throttle opening of the onboard engine, the first speed detecting means comprises a speed detector which detects the rotational speed of the output shaft of the change gearing, and the means for detecting the speed ratio comprises calculation means for detecting a ratio of the rotational speed of the output shaft over the rotational speed of the input shaft of the torque converter on the basis of the rotational speed detected by the first speed detecting means, a gear ratio of the change gearing and the rotational speed of the engine detected by the second speed detecting means.

* * * * *